(12) United States Patent
Oga

(10) Patent No.: US 8,509,855 B2
(45) Date of Patent: *Aug. 13, 2013

(54) MOBILE INFORMATION TERMINAL HAVING OPERATION KEYS AND A DISPLAY ON OPPOSITE SIDES

(71) Applicant: NEC Corporation, Tokyo (JP)

(72) Inventor: Toshiyuki Oga, Tokyo (JP)

(73) Assignee: NEC Corporation (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/658,501

(22) Filed: Oct. 23, 2012

(65) Prior Publication Data

US 2013/0053108 A1 Feb. 28, 2013

Related U.S. Application Data

(63) Continuation of application No. 13/251,751, filed on Oct. 3, 2011, now Pat. No. 8,326,369, which is a continuation of application No. 12/854,499, filed on Aug. 11, 2010, now Pat. No. 8,050,721, which is a continuation of application No. 10/566,961, filed as application No. PCT/JP2004/010609 on Jul. 26, 2004, now Pat. No. 7,801,566.

(30) Foreign Application Priority Data

Jul. 28, 2003 (JP) ................................. 2003-280996

(51) Int. Cl.
*H04M 1/00* (2006.01)
(52) U.S. Cl.
USPC ........... 455/566; 345/649; 345/169; 345/158; 345/156; 345/698

(58) Field of Classification Search
None
See application file for complete search history.

(56) References Cited

U.S. PATENT DOCUMENTS

2002/0140675 A1 10/2002 Ali et al.
2002/0167488 A1 11/2002 Hinckley et al.
(Continued)

FOREIGN PATENT DOCUMENTS

JP 03-238518 10/1991
JP 06-089634 3/1994
(Continued)

OTHER PUBLICATIONS

Japanese Office Action mailed Nov. 20, 2012 in connection with corresponding Japanese Patent Application No. 2011-065888 and English translation thereof.
(Continued)

*Primary Examiner* — Charles Shedrick
(74) *Attorney, Agent, or Firm* — Ostrolenk Faber LLP

(57) ABSTRACT

A mobile information terminal has a front surface on which a display surface of a display device is arranged and a rear surface on which a plurality of operation keys are arranged. The mobile information terminal further has a half-depressing sensor for detecting that each of the operation keys is half-depressed and/or a touch sensor for detecting that each of the operation keys is touched. A control section executes a processing operation to cause the display device to display an image showing the arrangement of said operation keys and to change an icon which corresponds to a key of operation keys when a control section determines, according to an input signal from the half-depressing sensor or the touch sensor, that the finger of the operator is placed on this key of operation keys.

33 Claims, 7 Drawing Sheets

(56) References Cited

U.S. PATENT DOCUMENTS

| | | |
|---|---|---|
| 2002/0180767 A1 | 12/2002 | Northway et al. |
| 2002/0198029 A1 | 12/2002 | Tenhunen et al. |
| 2004/0201595 A1 | 10/2004 | Manchester |
| 2005/0090288 A1 | 4/2005 | Stohr et al. |
| 2007/0063976 A1 | 3/2007 | Oga |
| 2007/0109260 A1 | 5/2007 | Moon et al. |
| 2008/0062134 A1 | 3/2008 | Duarte et al. |

FOREIGN PATENT DOCUMENTS

| | | |
|---|---|---|
| JP | 06-343092 | 12/1994 |
| JP | 07-072953 | 3/1995 |
| JP | 08-110826 | 4/1996 |
| JP | 09-288542 | 11/1997 |
| JP | 10-171600 | 6/1998 |
| JP | 2000-324223 | 11/2000 |
| JP | 2002-157087 | 5/2002 |
| JP | 2002-244791 | 8/2002 |
| JP | 2002-359682 | 12/2002 |
| JP | 2003-087420 | 3/2003 |
| JP | 2003-186622 | 7/2003 |
| JP | 2003-188970 | 7/2003 |
| JP | 2003-330611 | 11/2003 |
| WO | WO 02/079958 | 10/2002 |

OTHER PUBLICATIONS

Japanese Office Action mailed Oct. 9, 2012 in connection with corresponding Japanese Patent Application No. 2011-202056 and English translation thereof.

Japanese Office Action mailed Oct. 9, 2012 in connection with corresponding Japanese Patent Application No. 2011-202055 and English translation thereof.

Partial Japanese Office Action mailed May 21, 2013 in connection with corresponding Japanese Patent Application No. 2011-202055 and partial English translation thereof.

MOBILE INFORMATION TERMINAL HAVING OPERATION KEYS AND A DISPLAY ON OPPOSITE SIDES

CROSS-REFERENCE TO RELATED APPLICATIONS

The present application is a continuation of under 37 C.F.R. §1.53(b) of prior U.S. application Ser. No. 13/251,751 filed Oct. 3, 2011 by Toshiyuki OGA, entitled MOBILE INFORMATION TERMINAL HAVING OPERATION KEYS AND A DISPLAY ON OPPOSITE SIDES, which is a continuation of under 37 C.F.R. §1.53(b) of prior U.S. application Ser. No. 12/854,499 filed Aug. 11, 2010 by Toshiyuki O G A, entitled MOBILE INFORMATION TERMINAL HAVING OPERATION KEYS AND A DISPLAY ON OPPOSITE SIDES, which application is a continuation of U.S. application Ser. No. 10/566,961 filed Jan. 27, 2006, which application is a 35 U.S.C. §§371 national phase conversion of PCT/JP2004/010609 filed 26 Jul. 2004 which claims priority to Japanese Patent Application No: 2003-280996 filed 28 Jul. 2003, all of which are incorporated herein by reference. The PCT International Application was published in the Japanese language.

TECHNICAL FIELD

The present invention relates to a mobile information terminal which is provided with a built-in computer for executing various types of information processing, an input device through which an operator inputs information, and a display device for presenting information to the operator.

BACKGROUND ART

Recently, mobile information terminals represented by portable telephones have come into widespread use. As shown in FIG. 1A, 1B, such portable telephones are provided with display devices 11, 21 for displaying information and an input device composed of operation keys 12, 22, a pointing device (not shown) and the like. Portable telephone 10, which is entirely encased in a single housing as shown in FIG. 1A, is known as one of portable telephones. Folding portable telephone 20, which has two casings that are jointed by a hinge as shown in FIG. 1B and which can be changed between an open state in which both casings are side by side, and a folded state in which both casings are folded together for convenience of portability, is also known. In either case, display devices 11, 21 and the input device are usually disposed on the same side as each other so that a user can operate the input device while viewing display devices 11, 21. Further, keys and a pointing device may be arranged on a side surface facing a direction that is perpendicular to the surface on which display device 11, 21 are disposed.

In contrast, a mobile information terminal, in which some operation keys are arranged on the rear surface (a surface placed back to back with the display surface of a display device) of a surface on which a display surface of a display device is disposed, is disclosed in Japanese Patent Application Laid-Open No. 2000-236376. Further, a mobile information terminal, in which a touch panel is arranged on a rear surface, is disclosed in Japanese Patent Application Laid-Open No. 2002-77357.

However, configurations, in which an input device is arranged either on the same surface as the display surface of a display device of a mobile information terminal or on a side surface, as in the general prior art, have the following drawbacks:

(1) When a user holds a mobile information terminal in his/her hand, fingers of the hand holding the mobile information terminal extend around the rear side of the mobile information terminal. Therefore, superior ease of operation cannot be achieved when the user wants to operate an input device disposed on the side of a display surface of a display device with one hand holding the mobile information terminal.

(2) In a case where an input device is disposed on the side surface of a mobile information terminal, because the side surface is narrow and provides a restricted area for disposing the device, when an input device for performing a complicated input operation, for example, a pointing device to input values of two-dimensional coordinates is disposed on the side surface, an operation to input information into the device by hand is apt to be difficult. In particular, an operation that uses the finger(s) of one hand holding the mobile information terminal is apt to be difficult.

(3) In a case in which the user operates a mobile information terminal with the fingers of one hand holding the mobile information terminal in a condition in which the user holds a mobile information terminal in his/her hand, the user is only able to operate the terminal with some of his/her fingers, for example, an index finger, the thumb or the like, because the fingers of the hand are used to hold the mobile information terminal. Therefore, operation efficiency is apt to be reduced.

(4) In a case in which a user performs an input operation while holding a mobile information terminal in his/her hand, when the user performs an input operation with a hand that is different from the hand holding the mobile information terminal in order to avoid the problems (1) to (3), the user has both hands fully occupied. Therefore, the user cannot use the hand(s) for other tasks. Further, there are cases where a user may wish to operate a mobile information terminal in a condition in which only one hand can be used, for example, a case where the user operates a mobile information terminal while holding a bag. In this case, the user is forced to perform an input operation with one hand that holds a mobile information terminal.

(5) In cases where a display device and an input device are disposed on the same surface as each other, there is mutual competition for installation of each device on the area of the terminal whose size is limited so that the mobile information terminal can be manufactured in a compact configuration as a portable device. Under these circumstances, when the display device is made large to improve visibility, the installation space for the input device is narrowed, thus sacrificing ease of operation. On the other hand, when the input device is made large to improve operability, visibility is sacrificed.

(6) In a case where a display device and an input device are disposed on the same surface as each other, when both are made large to improve both operability and visibility, the mobile information terminal itself is required to be made large. Therefore, portability is reduced.

In contrast, in the prior art disclosed in above-mentioned Japanese Patent Application Laid-Open No. 2000-236376 and Japanese Patent Application Laid-Open No. 2002-77357, the installation area for input devices disposed on a front side can have a margin to some degree by arranging a part of the input devices on a rear side, and thus operability can be improved to some extent.

However, in Japanese Patent Application Laid-Open No. 2000-236376, only limited kinds of input devices are arranged on a rear side such as a scroll key, a determination key, a clear key and the like, and most of the keys are still arranged on the front side. On the other hand, when operating keys arranged on the rear side, since an operator views the display device that is arranged on the front side, the operator cannot view his/her finger as it operates keys arranged on the rear side. Therefore, in cases where an increased numbers of keys are arranged on the rear side, the input operation becomes difficult.

Further, in Japanese Patent Application Laid-Open No. 2002-77357, as shown in FIGS. 2A and 2B, in mobile information terminal 30, touch panel 32 is disposed on surface 30b opposite to surface 30a on which display device 31 is disposed. This touch panel 32 is used to select one item among selection items that are displayed on display device 31 by touching the location on the rear side that is reverse to the location where the item to be selected is displayed. In this configuration, various input operations can be performed by using touch panel 32 disposed on the rear side. However, because the operator cannot view the finger with which he/she is performing the operation, the operator cannot determine precisely where the finger has been placed until the operation to select one item has been completed. Therefore, particularly in cases where there are many items to be selected and which are located in a narrow area, a mistake may be made in touching the location of the item to be selected, and as a result, an item different from the one intended is selected. Therefore, there is a problem in operability.

Further, there are cases where an operator can perform an input operation without viewing a display device during the input operation of a mobile information terminal, for example, in cases where the operator inputs a specific keyword. In this case, when the input device is disposed on the rear side, it may be more convenient for the operator to perform an input operation while viewing the rear side. However, mobile information terminal 30 disclosed in Japanese Patent Application Laid-Open No. 2002-77357 is not suitable for operating touch panel 32 disposed on surface 30b of the rear side while viewing mobile information terminal 30 from surface 30b of the rear side. That is, in mobile information terminal 30 disclosed in Japanese Patent Application Laid-Open No. 2002-77357, for example, when an input operation that uses alphabet is performed by using touch panel 32 of the rear side, as shown in FIG. 2A, the layout of areas that are used to input each letter, while mobile information terminal 30 is viewed from surface 30b of the rear side, is a mirror image of the layout of areas that are displayed on display device 30 while viewed from surface 30a of the front side. Therefore, a problem arises in that the input operation confuses the operator.

DISCLOSURE OF THE INVENTION

An object of the present invention is to provide a mobile information terminal wherein even if a large number of operation keys are disposed on a surface opposite to the display surface of the display device, an operator can smoothly perform an input operation by using the operation keys while viewing the display device. Further, another object of the present invention is to provide a mobile information terminal wherein, even when an operator performs an input operation by using operation keys disposed on a surface opposite to the display surface of the display device while viewing the surface opposite to the display surface, the operator can smoothly perform an input operation without being confused.

To achieve this object, a mobile information terminal according to the present invention comprises a display device and a plurality of operation keys. The display device and the operation keys are disposed on surfaces opposite to each other. The mobile information terminal further comprises finger position detecting mechanisms for detecting that a finger of an operator is placed on each of the operation keys. Signals from these operation keys and the finger position detecting mechanisms are entered into the control section of the mobile information terminal. This control section is at least able to control operation of the display device. The control section executes a processing operation that causes the display device to display an image of the arranged operation keys and, when the control section so determines, based on an input signal from the finger position detecting mechanism, that the finger of the operator has been placed on any of the operation keys, to change an icon which is included in the image of the arranged operation keys, that icon corresponding to the operation key on which the finger of the operator has been placed.

In this configuration, an operator, who intends to perform an input operation by using operation keys arranged on a rear side opposite to the side of the display surface while viewing the display device, can recognize one key of the operation keys on which the finger of the operator performing the operation is placed before fully depressing the operation key to confirm the input, by moving his/her finger on that key of operation keys and by ascertaining that an icon of that key of operation keys displayed on the display device is changed due to movement of the finger on that key of operation keys. Therefore, even if a large number of operation keys are arranged on the rear side opposite to the side of the display surface, the operator can smoothly perform a desired input operation without making any errors.

More specifically, a half-depressing sensor for detecting that each of the operation keys is half-depressed and/or a touch sensor for detecting that the finger of the operator touches each of the operation keys can be used as the finger position detecting mechanism. That is, before an operator confirms that an input has been entered by fully depressing an operation key, when the operator depresses an operation key to some degree, that is, when the operator half-depresses the operation key, the half-depressing sensor can detect this action and thus can detect that the finger of the operator is placed on the operation key. On the other hand, when the operator touches an operation key, the touch sensor can detect that the finger of the operator is placed on the operation key.

Specifically, executing a processing operation to change the icon that corresponds to the operation key, which is half-depressed or touched when the finger of the operator is placed on, can be performed by changing at least one of the following: the display color, the display figure, the display brightness, and the flickering pattern in the display of the icon.

Further, the control section may execute a processing operation to start or stop a predetermined program stored in advance when determining that the finger of the operator is placed on a predetermined operation key, or when determining, according to a signal from the finger position detecting mechanism, that the finger of the operator is sequentially placed on positions of a plurality of operation keys in a predetermined order, based on a signal from the finger position detecting mechanism, that is, when the operator performs a half-depressing operation or a touch operation for a predetermined operation key, or when the operator sequentially performs half-depressing operations or touch operations for a plurality of operation keys in a predetermined order. The predetermined program in this case may be a program such as an application program or the like which is preset by the operator. In particular, this predetermined program can be a program to execute at least one of the following: a processing operation to display a predetermined image on the display device or to stop the display, a processing operation to display information of predetermined selection items on the display device, a processing operation to turn the light of an illuminator on or off or to cause the illuminator to flicker, a processing operation to generate or to stop the vibration of a predetermined rhythm and frequency pattern, a processing operation to generate or to stop the sound of a predetermined tone, scale and rhythm pattern, and a processing operation to connect the mobile information terminal to another information processing apparatus which can be connected with the mobile information terminal through a network or to disconnect the connection. Based upon executing the processing operation to start or to stop this program, the operator can more easily recognize one of the operation keys on which the finger of the operator performing an operation is placed, or the operator can easily execute a predetermined processing operation by half-depressing or touching an operation key.

The mobile information terminal according to the present invention may further comprise a gravity sensor for detecting whether gravity is applied in a direction from a side of the display surface of the display device to a side opposite to the side or whether gravity is applied in the opposite direction, and the control section may execute a processing operation to change the assignment of key codes to the operation keys, in response to an input signal from the gravity sensor.

Specifically, the assignment of the key codes to the operation keys can be changed such that the arrangement of the key codes assigned to the operation keys when the gravity is applied in the direction from the side of the display surface of the display device to the opposite side, that is, when the side of the display surface is directed upward, is a mirror image of the arrangement of the key codes assigned to the operation keys when the gravity is applied in the opposite direction, that is, when a surface of a side opposite to the side of the display surface is directed upward. Thereby, the arrangement of icons of the operation keys displayed on the display device at the time when the operator performs an input operation while directing the display surface to be pointed upward, that is, while viewing the display of the display device, can be the same as the arrangement of the operation keys at the time when the operator performs an input operation while directing a side opposite to the side of the display surface to be pointed upward, that is, while viewing the side on which the operation keys are disposed. As a result, even when the operator performs an input operation while viewing the side on which the operation keys are disposed, the operator can smoothly perform an input operation without being confused.

In a mobile information terminal that executes a processing operation to display operation keys disposed on a surface of a side opposite to the side of the display surface, the above-described processing operation to change the assignment of the key codes, even if this processing operation is executed independently from the processing operation to change a display by using the finger position detecting mechanism, that is, is executed in the mobile information terminal that does not execute this processing operation to change the display, works to improve operability by matching the arrangement of icons of the operation keys displayed on the display device with the arrangement of the operation keys at the time when the side that is opposite to the side of the display surface is directed upward.

BEST MODE FOR CARRYING OUT THE INVENTION

Figure 1A:
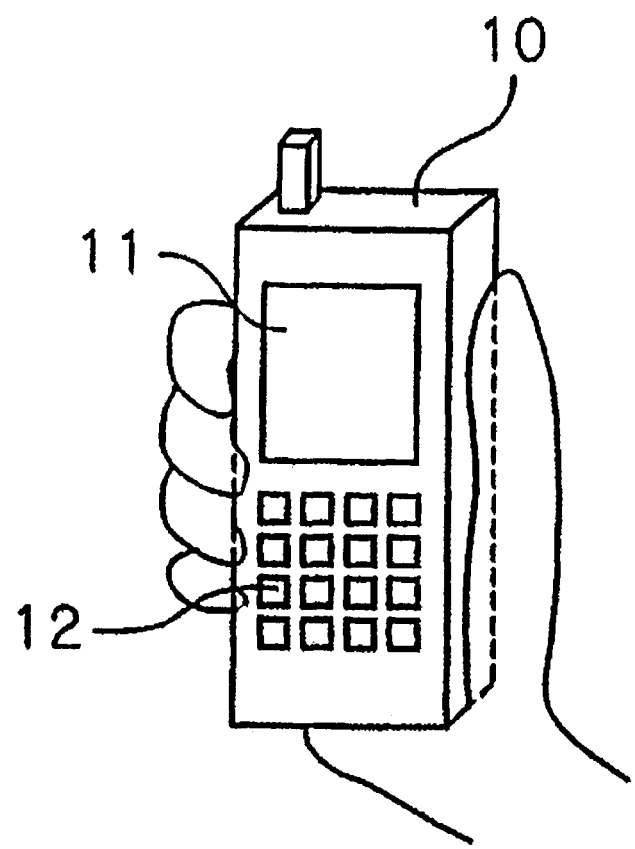
FIG. 1A is a schematic view showing a condition in which a conventional mobile information terminal is held in a hand.
Figure 1B:
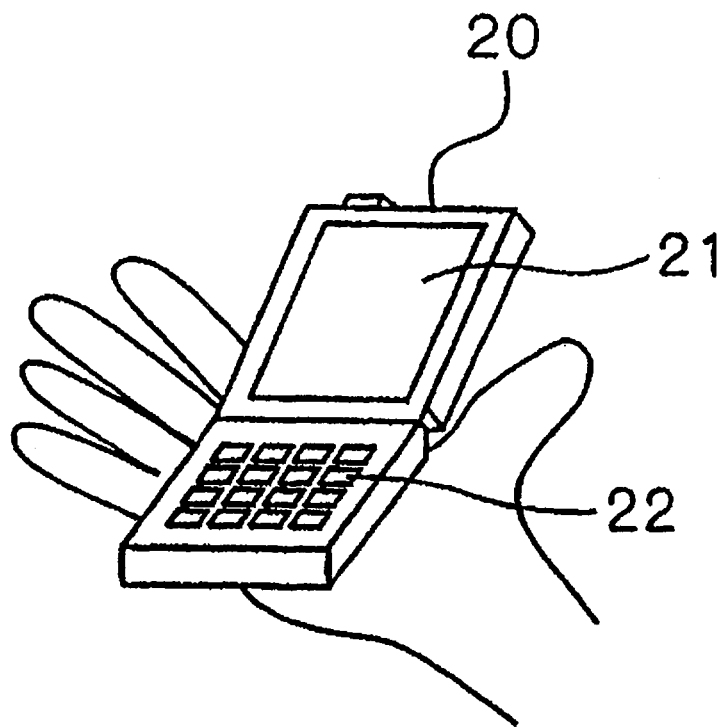
FIG. 1B is a schematic view showing a condition in which a conventional mobile information terminal is held in a hand.
Figure 2A:
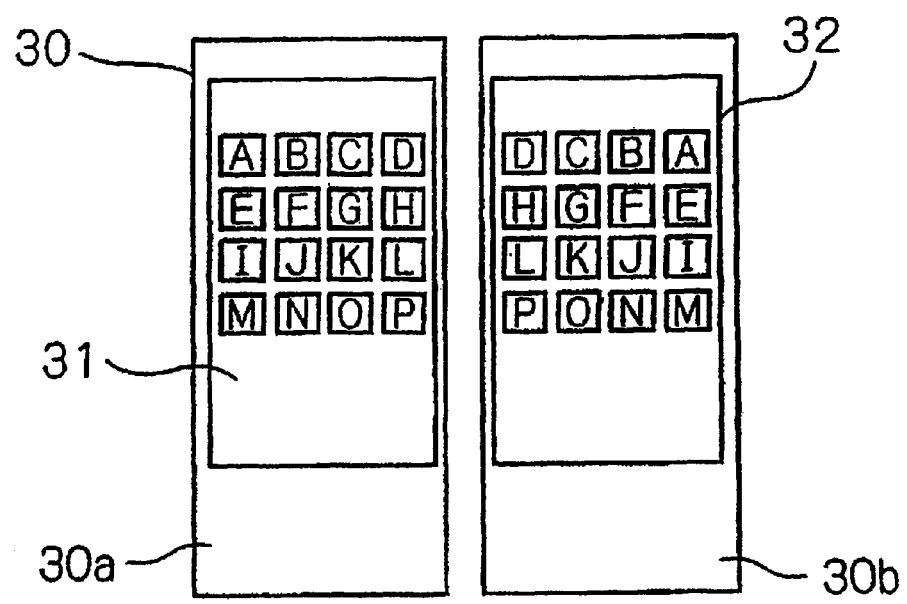
FIG. 2A is a plan view of a conventional mobile information terminal that shows both a front side and a rear side thereof.
Figure 2B:
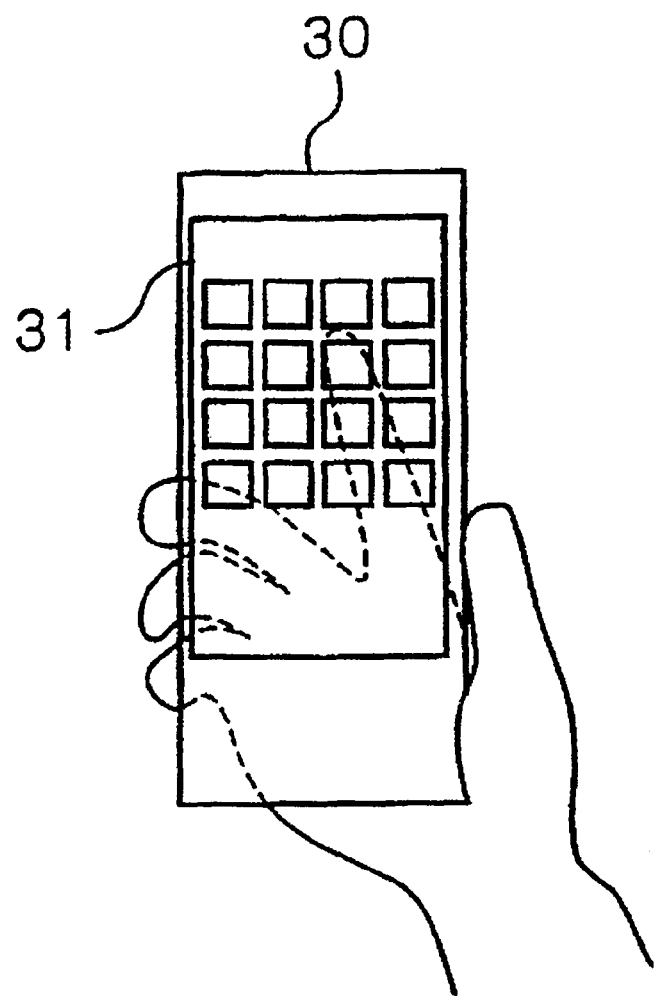
FIG. 2B is a schematic view showing a condition in which the mobile information terminal shown in FIG. 2A is held in a hand.
Figure 3A:
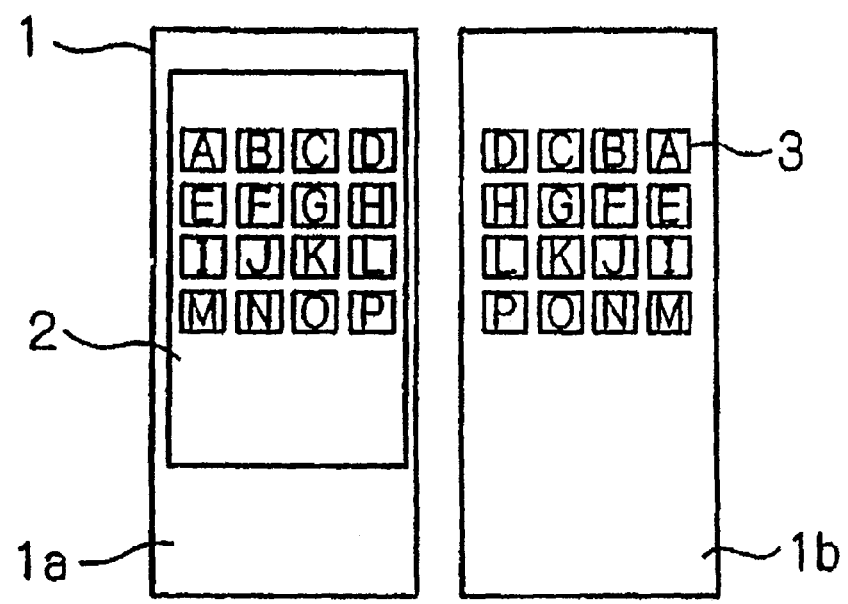
FIG. 3A is a plan view of a mobile information terminal according to an embodiment of the present invention that shows both a front side and a rear side thereof and positioned such that a front surface, on which a display surface of the mobile information terminal is arranged, is directed upward.
Figure 3B:
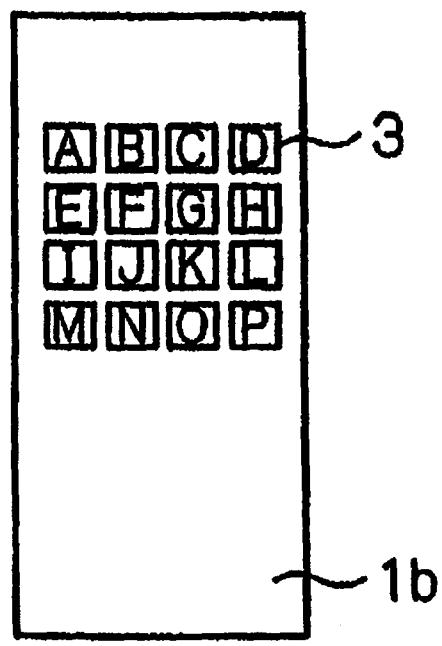
FIG. 3B is a plan view on the rear side of the mobile information terminal shown in FIG. 3A showing the condition in which the rear side is directed upward.
Figure 4:
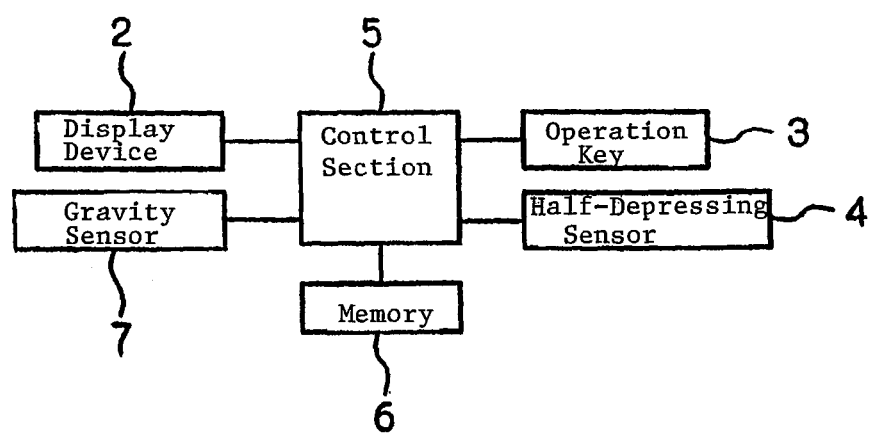
FIG. 4 is a block diagram showing a general configuration of the mobile information terminal shown in FIGS. 3A and 3B.

As shown in FIGS. 3A and 3B, mobile information terminal 1 according to this embodiment is provided with a display surface of display device 2 disposed on front side 1a thereof and a plurality of operation keys 3 disposed on rear side 1b opposite to front side 1a. As shown in FIG. 4, control section 5 composed of a computer and an electronic circuit is built in this mobile information terminal 1. Operation signals of operation keys 3 are entered into control section 5, and display device 2 displays various pieces of information under the control of control section 5.

In control section 5, programs are stored to make the computer of control section 5 execute various types of information processing, display control processing, and the like. Memory 6 used for various types of processing operations executed in the computer is connected to control section 5. Memory 6 can also store various types of information inputted through operation keys 3. Further, mobile information terminal 1 may be configured so that it can be connected to a radio communication network, as in a portable telephone. In this case, information, a new application program, or the like downloaded through the network may be stored in memory 6.

Mobile information terminal 1 is further provided with half-depressing sensor 4. When each key of operation keys 3 is depressed to some degree, even if these keys are not fully depressed, half-depressing sensor 4 detects this. Further, mobile information terminal 1 is provided with gravity sensor 7 for detecting whether gravity is applied in a direction from front side 1a to rear side 1b or in the opposite direction. Detection signals from these sensors are entered into control section 5.

Next, input operation for mobile information terminal 1 according to this embodiment is described.

Initially, a case where an operator holds mobile information terminal 1 in his/her hand and performs an input operation while viewing the display of display device 2 is described. In this case, as shown in FIG. 3A, images (icons) of operation keys 3 are arranged and displayed on display device 2 as if operation keys 3 are seen through intermediates. That is, the arranged icons, which include marks showing key codes such as A, B, C,—in the example shown in FIG. 3A, the key codes being recognized in control section 5, when the corresponding key in operation keys 3 is pressed, is displayed on display device 2. In this case, as seen from FIG. 3A, the arrangement of key codes, which are included in the icons of operation keys 3 displayed on display device 2 and are seen from front side 1a, is a mirror image of the arrangement of the key codes which are seen from rear side 1b, the key codes being recognized in control section 5 when each of operation keys 3 is pressed.

Then, when a key of operation keys 3 is depressed to some degree but is not fully depressed, that is, when the key of operation keys 3 is set in a condition in which it is half-depressed, control section 5 recognizes this through half-depressing sensor 4 and executes the display processing operation for display device 2 to indicate that the key of operation keys 3 is in the half-depressed condition. This display processing operation can be implemented by changing an icon corresponding to a half-depressed key in operation keys 3, that is, for example, by changing a color, a figure, a display brightness and/or a flickering pattern of an icon of the half-depressed key in operation keys 3 or by displaying a picture of a finger superimposed on the icon of the half-depressed key in operation keys 3. Further, when the key of operation keys 3 has been fully depressed, the display for indicating this may be implemented. In this case, it is preferable that any change in the display of display device 2, which occurs when a key is half-depressed, be different from any change in the display which occurs when the key is fully depressed.

When the display operation described above has been performed, an operator can determine, as regards a key of operation keys 3, that a finger of the operator operating operation keys 3, that are disposed on rear side 1b, has been placed on the key before confirming a key code to be inputted which is done by fully depressing the key of operation keys 3. Therefore, by performing the press operation for a key of operation keys 3, while determining that one of operation keys 3 has been half-depressed, the operator can accurately press a desired key of operation keys 3 without erroneously pressing a different key of operation keys 3.

At this time, icons of operation keys 3 can be simultaneously displayed with the display of other information by displaying the icons of operation keys 3 such that they overlap with another display, or by displaying the icons of operation keys 3 in a display area that is different from the display area where the other information is displayed. Further, icons of operation keys 3 may be displayed only when any one of operation keys 3 is half-depressed, or icons of operation keys 3 may be displayed by being exchanged with the other information displayed on display device 2 only while any one of operation keys 3 is half-depressed.

Next, a case where mobile information terminal 1, according to this embodiment, is operated in a condition in which mobile information terminal 1 is viewed from rear side 1b thereof, is described.

In this case, a key code that is recognized by control section 5 during the operation of a key of operation keys 3 is changed from a key code when an operator operates operation keys 3 while viewing display device 2 in this embodiment. That is, the arrangement of key codes assigned to operation keys 3 is set such that the arrangement, shown in FIG. 3B, at the time when an operator holds mobile information terminal 1 while directing rear side 1b to be pointed upward, is a mirror image of the arrangement, shown in FIG. 3A, at the time when an operator holds mobile information terminal 1 while directing front side 1a to be pointed upward. Therefore, the arrangement of key codes assigned to operation keys 3 at the time when an operator holds mobile information terminal 1, while directing rear side 1b to be pointed upward, is the same as the arrangement of icons of operation keys 3 displayed on display device 2 at the time when an operator holds mobile information terminal 1, while directing front side 1a to be pointed upward. Accordingly, the operator can operate operation keys 3 without being confused even in a condition in which an operator directs rear side 1b to be pointed upward.

Control section 5 can control this switching of the assignment of key codes to operation keys 3 by determining, in accordance with a detection signal from gravity sensor 7, whether mobile information terminal 1 is set in a condition in which front side 1a is directed upward or is set in a condition in which rear side 1b is directed upward. However, it is desirable that this switching of the assignment of key codes to operation keys 3 is not executed in some cases such as a case where the detection operation of gravity sensor 7 becomes unstable due to the acceleration and deceleration of a vehicle when mobile information terminal 1 is operated in the vehicle. Therefore, it is preferable that the switching function for key codes can be freely turned on and off.

Further, it is preferable that letters corresponding to key codes assigned to operation keys 3 when rear side 1b is directed upward be marked on operation keys 3 by printing in order to improve the ease of operation for operation keys 3 when rear side 1b is directed upward. In this case, during an operation when front side 1a is directed upward, key codes recognized in control section 5 at the time that each of operation keys 3 are operated, do not coincide with key codes marked on operation keys 3. However, no confusion is generated as a result of the marking of letters on operation keys 3, during the operation, because the operator views display device 2 and does not view the letters that are marked on operation keys 3 at this time.

Figure 5:
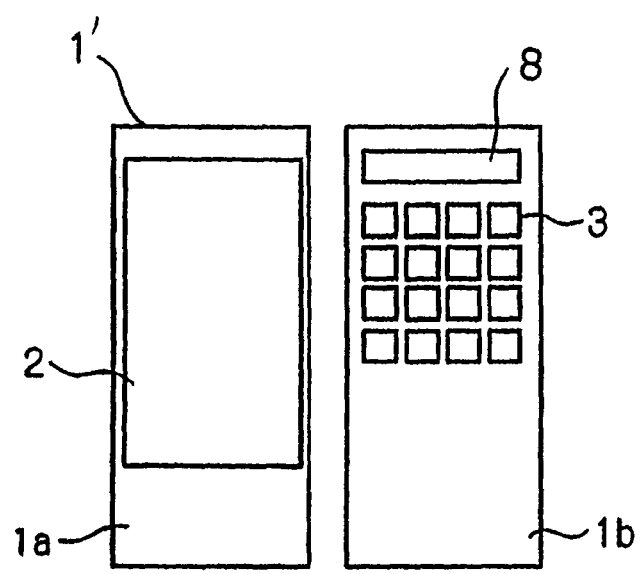
FIG. 5 is a schematic view of a mobile information terminal according to an alternative embodiment to FIGS. 3A and 3B.

Moreover, in mobile information terminal 1', according to an alternative embodiment shown in FIG. 5, sub-display device 8 whose size does not restrict the layout area of operation keys 3, may be disposed on rear side 1b. In this way, a key operation can be more easily performed when rear side 1b is directed upward. That is, for example, a character string inputted through operation keys 3 can be displayed on sub-display device 8. Further, other information, such as information that indicates the input that has been performed, which is a desirable indication to have during a key input operation, can be displayed on this sub-display device 8.

As described above, according to the embodiments, an operator, who holds mobile information terminal 1, 1' in his/her hand and operates operation keys 3 on rear side 1b, while viewing the display of display device 2 on front side 1a, can determine the key of operation keys 3, on which the finger of the operator performing an operation is placed, in accordance with a display of display device 2, by half-depressing the key of operation keys 3 before confirming the key code of a letter or the like that is to be inputted by the action of fully depressing the key of operation keys 3. Accordingly, the operator can easily perform a desired key operation without making errors. Further, in mobile information terminals 1, 1' according to the embodiments, the arrangement of operation keys 3 at the time that rear side 1b is directed upward can be made the same as the arrangement of icons of operation keys 3 displayed at the time that front side 1a is directed upward. Thereby, an operator can perform an input operation without becoming confused even in a case where the operator performs the operation while viewing rear side 1b.

In the embodiments, an example that uses half-depressing sensor 4 for detecting that each of operation keys 3 is depressed half way is described. However, a touch sensor for detecting that a finger touches each of operation keys 3 may be used instead of half-depressing sensor 4. In this case, an operator can ascertain the position of his/her finger just by touching any one of operation keys 3 without depressing it half way. Therefore, ease of the operation is further improved.

Further, both half-depressing sensor 4 and a touch sensor may be provided. Thereby, control section 5 can recognize that different pieces of information are respectively inputted through the operation of one key of operation keys 3 that corresponds to three types of conditions: when a key is lightly touched, when a key is depressed half-way and when a key is fully depressed. That is, various pieces of information can be inputted by a simple operation.

Moreover, control section 5 may execute or stop a predetermined program when any one of operation keys 3 is depressed half-way, or when any one of operation keys 3 is lightly touched so that a predetermined function is performed. For example, in mobile information terminal 1 having a configuration in which an illuminator is disposed in display device 2, the illuminator may be lighted when any one of operation keys 3 is half-depressed or lightly touched. Thereby, the display can be easily seen during an operation. Further, as in a portable telephone, mobile information terminal 1 may be provided with a sound generating mechanism and/or a vibration generating mechanism, and one of following: a processing operation to display a predetermined image for a predetermined time or until a next operation is performed, a processing operation to turn an illuminator on or off or to cause the illuminator to flicker in a predetermined pattern, a processing operation to generate or to stop a sound having a predetermined tone, scale, and rhythm pattern, a processing operation to generate or to stop a vibration having a predetermined rhythm and frequency pattern, and a combination of these operations, may be executed when one predetermined key of operation keys 3 is half-depressed or lightly touched, or when some predetermined keys of operation keys 3 are sequentially half-depressed or lightly touched in a predetermined order. These types of processing operations may be performed for a purpose that an operator can more easily recognize any one of operation keys 3 that is half-depressed or has been lightly touched by the operator or may be executed for another purpose, that is, may be executed so as to execute a desired processing operation by a simple operation. Moreover, the generated sound or vibration may be coded like Morse Code so as to include a plurality of pieces of information.

Furthermore, a processing operation to start and/or to stop an application program preset by an operator, a processing operation to connect mobile information terminal 1 with another preset apparatus through a network to which mobile information terminal 1 can be connected and to start and/or to stop communication with the apparatus, and/or a processing operation to display and/or to delete an image indicating selection information such as a list of stored application programs, may be executed when one or more predetermined keys of operation keys 3 are half-depressed or lightly touched. In a case where the image indicating selection information is displayed, the selection operation associated with this action may be performed with operation keys 3. However, this operation may be performed with another input device, which enables information to be input, without the need for display device 2, such as through a touch sensor, a pointing device, an operation key(s) disposed on front side 1a or a side surface, or a small number of operation keys which is disposed at another position of rear side 1b away from operation keys 3, or which has a size, a shape and the like that are different from those of operation keys 3.

Furthermore, each key of operation keys 3 or some keys of operation keys 3 that are placed at a predetermined positions may have their external shape changed, may be provided with an irregular part having different patterns, and/or the roughness or softness of the surfaces thereof may be changed, so that, when an operator touches a key of operation keys 3 with his/her finger, the operator can recognize this particular key of operation keys 3 up to a point. Thereby, the operator can more easily recognize the position of a finger on rear side 1b which is impossible to see.

The invention claimed is:

1. A mobile information terminal comprising:
a display device disposed on a display surface;
a plurality of operation keys disposed on a rear surface located on a reverse side of a front surface which is said display surface to output an input signal;
a finger position detecting mechanism which detects that a finger of an operator is placed on one of said operation keys to output a position signal by which said one of operation keys is identified, and
a control section which receives said input signal and said position signal and which controls an operation of said display device,
wherein said control section executes a display processing operation to change an image on said display device according to said position signal.

2. The mobile information terminal according to claim 1, wherein
said change of said image in said display processing operation is different from a change of an image on said display device when said one of operation keys is fully depressed.

3. The mobile information terminal according to claim 1, wherein
said control section causes said display device to display an arrangement image which shows an arrangement of said operation keys, and
said control section executes a display processing operation to change a part of said arrangement image, said part corresponding to said one of operation keys identified by said position signal.

4. The mobile information terminal according to claim 1, wherein
said control section causes said display device to display an arrangement image which shows an arrangement of said operation keys instead of another information display while said finger position detecting mechanism is detecting that said finger of said operator is placed on said one of operation keys.

5. The mobile information terminal according to claim 1, wherein
said finger position detecting mechanism detects a first state that indicates that said finger of said operator touches said one of operation keys to output a first signal, and detects a second state that indicates that said one of operation keys is half-depressed to output a second signal, respectively, and
said control section receives said first signal, said second signal, and said input signal that indicates that said one of operation keys is fully depressed to execute processing according to said signals.

6. A mobile information terminal comprising:
a display device disposed on a display surface;
a plurality of operation keys disposed on a rear surface located on a reverse side of a front surface which is said display surface to output an input signal;
a finger position detecting mechanism which detects that a finger of an operator is placed on one of said operation keys to output a position signal by which said one of operation keys is identified, and a control section which receives said input signal and said position signal and which controls an operation of said display device, wherein said mobile information terminal, in response to said position signal, carries out a predetermined operation that is assigned to said one of operation keys.

7. The mobile information terminal according to claim 6, wherein said predetermined operation is an input of a code.

8. The mobile information terminal according to claim 6, wherein said predetermined operation is an operation that turns on the light of an illuminator, an operation that turns off the light of the illuminator or an operation that flickers the light of the illuminator in a predetermined pattern.

9. The mobile information terminal according to claim 6, wherein said predetermined operation is an operation that generates or stops a sound having a predetermined tone, scale, or rhythm pattern.

10. The mobile information terminal according to claim 6, wherein said predetermined operation is an operation that generates or stops a vibration having a predetermined rhythm or frequency pattern.

11. The mobile information terminal according to claim 6, wherein:

said predetermined operation is a combination of at least two operations from among:

an operation that turns on the light of an illuminator;

an operation that turns off the light of the illuminator;

an operation that flickers the light of the illuminator in predetermined pattern;

an operation that generates or stops a sound having a predetermined tone pattern;

an operation that generates or stops a sound having a predetermined scale pattern;

an operation that generates or stops a sound having a predetermined rhythm pattern;

an operation that generates or stops a vibration having a predetermined rhythm pattern; and an operation that generates or stops a vibration having a predetermined frequency pattern.

12. The mobile information terminal according to claim 9, wherein said sound includes a plurality of pieces of information that are coded.

13. The mobile information terminal according to claim 10, wherein said vibration includes a plurality of pieces of information that are coded.

14. The mobile information terminal according to claim 6, wherein said predetermined operation is an operation that starts or stops a predetermined application program.

15. The mobile information terminal according to claim 6, wherein said predetermined operation is an operation that starts or stops a communication with an external device through a network.

16. A mobile information terminal comprising:

a display device disposed on a display surface;

an input device disposed on a rear surface located on a reverse side of a front surface which is said display surface, said input device determining information, which corresponds to a position designated by an operator, according to an operation of said operator, said input device outputting said determined information as an input information signal;

a finger position detecting mechanism which detects a position of a finger of said operator on said input device to output a position signal by which said detected position is identified; and a control section which receives said input information signal and said position signal and which controls an operation of said display device, wherein said control section executes a display processing operation to change an image on said display device according to said position signal.

17. A mobile information terminal comprising:

a display device disposed on a display surface;

an input device disposed on a rear surface located on a reverse side of a front surface which is said display surface, said input device determining information, which corresponds to a position designated by an operator, according to an operation of said operator, said input device outputting said determined information as an input information signal, said input device comprising a finger position detecting mechanism which detects a position of a finger of said operator to output a position signal by which said detected position is identified; and a control section which receives said input information signal and said position signal and which controls an operation of said display device, wherein said control section executes a display processing operation to change an image on said display device according to said position signal.

18. The mobile information terminal according to claim 17, wherein said change of said image in said display processing operation is different from a change of an image on said display when said input device determines said information.

19. The mobile information terminal according to claim 17, wherein said control section causes said display device to display an image of said input device, and said control section executes a display processing operation to change a part of said image of said input device, said part corresponding to said position identified by said position signal.

20. The mobile information terminal according to claim 17, wherein said control section causes said display device to display an image of said input device instead of another information display while said finger position detecting mechanism is detecting that said finger of said operator is placed on said input device.

21. The mobile information terminal according to claim 17, wherein said input device relates pieces of information with a predetermined position and selects one piece of information from among said pieces of information according to operations of said finger of said operator.

22. The mobile information terminal according to claim 21, wherein said operations of said finger of said operator include at least two of a touch, a weak push and a strong push.

23. The mobile information terminal according to claim 21, wherein said operations of said finger of said operator include at least two of a touch, a short stroke and a long stroke.

24. A mobile information terminal comprising:
a display device disposed on a display surface;
an input device disposed on a rear surface located on a reverse side of a front surface which is said display surface, said input device determining information, which corresponds to a position designated by an operator, according to an operation of said operator, said input device outputting said determined information as an input information signal, said input device comprising a finger position detecting mechanism which detects a position of a finger of said operator to output a position signal by which said detected position is identified; and
a control section which receives said input information signal and said position signal and which controls an operation of said display device,
wherein said mobile information terminal, in response to said position signal, carries out a predetermined operation.

25. The mobile information terminal according to claim 24, wherein
said predetermined operation is an input of a code.

26. The mobile information terminal according to claim 24, wherein
said predetermined operation is
an operation that turns on the light of an illuminator,
an operation that turns off the light of the illuminator or
an operation that flickers the light of the illuminator in a predetermined pattern.

27. The mobile information terminal according to claim 24, wherein
said predetermined operation is an operation that generates or stops a sound having a predetermined tone, scale, or rhythm pattern.

28. The mobile information terminal according to claim 24, wherein
said predetermined operation is an operation that generates or stops a vibration having a predetermined rhythm or frequency pattern.

29. The mobile information terminal according to claim 24, wherein
said predetermined operation is a combination of at least two operations from
among:
an operation that turns on the light of an illuminator;
an operation that turns off the light of the illuminator;
an operation that flickers the light of the illuminator in predetermined pattern;
an operation that generates or stops a sound having a predetermined tone pattern;
an operation that generates or stops a sound having a predetermined scale pattern;
an operation that generates or stops a sound having a predetermined rhythm pattern;
an operation that generates or stops a vibration having a predetermined rhythm pattern; and
an operation that generates or stops a vibration having a predetermined frequency pattern.

30. The mobile information terminal according to claim 27, wherein
said sound includes a plurality of pieces of information that are coded.

31. The mobile information terminal according to claim 28, wherein
said vibration includes a plurality of pieces of information that are coded.

32. The mobile information terminal according to claim 24, wherein
said predetermined operation is an operation that starts or stops a predetermined application program.

33. The mobile information terminal according to claim 24, wherein
said predetermined operation is an operation that starts or stops a communication with an external device through a network.

* * * * *